Jan. 25, 1955 W. A. RAY 2,700,393
MANUAL RESET VALVE STRUCTURE
Filed July 29, 1949 4 Sheets-Sheet 1

WILLIAM A. RAY,
INVENTOR.

BY John Flam
ATTORNEY

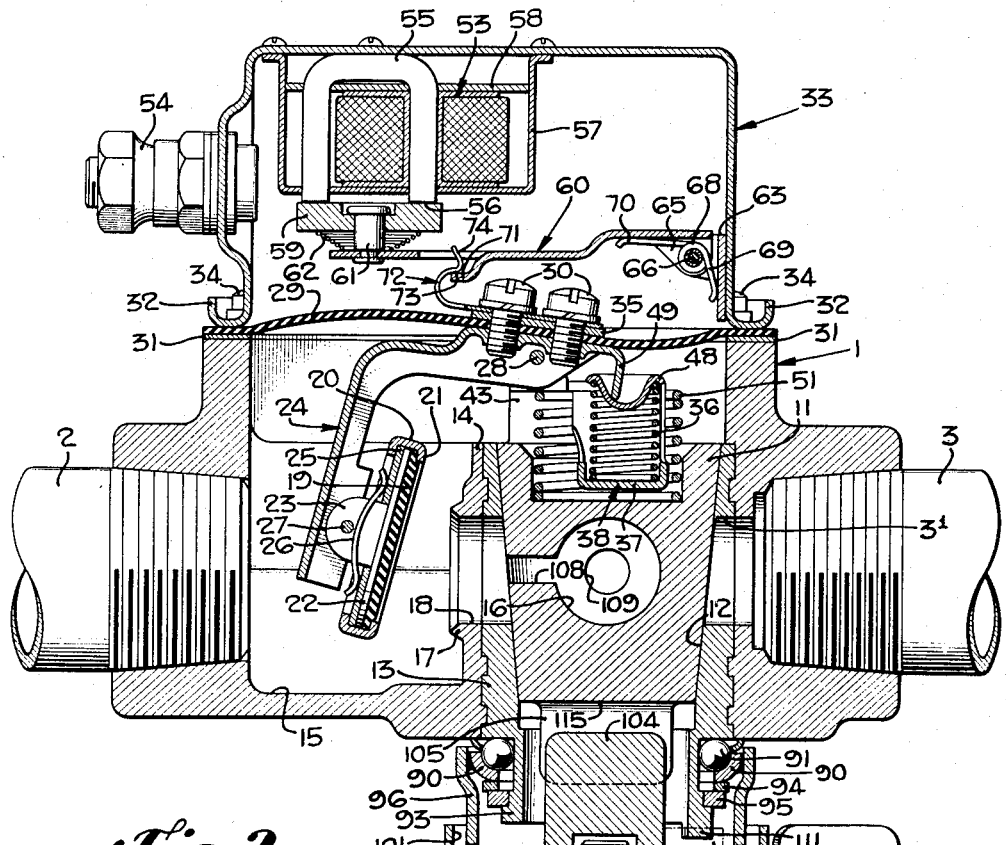
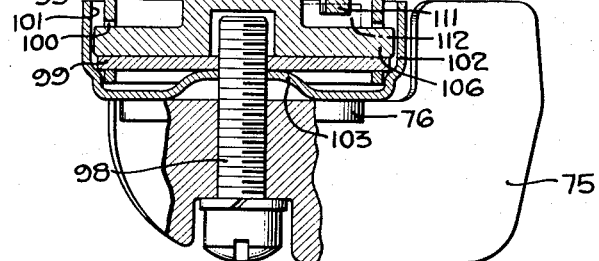
Fig. 2.
Fig. 8.
WILLIAM A. RAY,
INVENTOR.
BY John Flam
ATTORNEY Jan. 25, 1955 W. A. RAY 2,700,393
MANUAL RESET VALVE STRUCTURE
Filed July 29, 1949 4 Sheets-Sheet 3

WILLIAM A. RAY,
INVENTOR.

BY John Flam
ATTORNEY

Jan. 25, 1955 W. A. RAY 2,700,393
MANUAL RESET VALVE STRUCTURE
Filed July 29, 1949 4 Sheets-Sheet 4
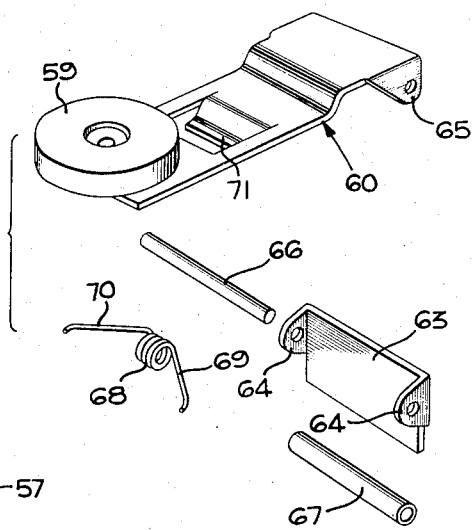
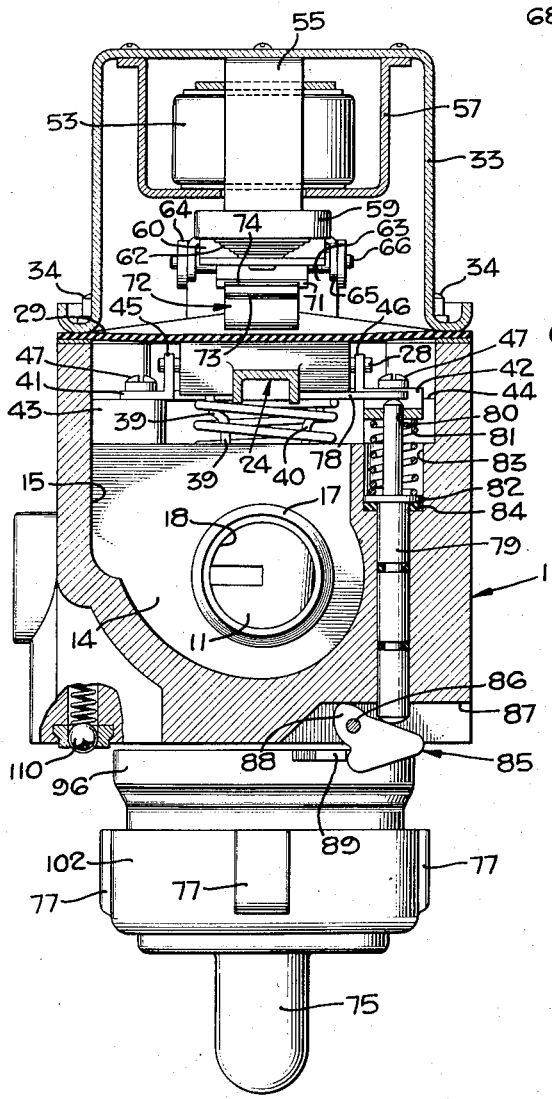
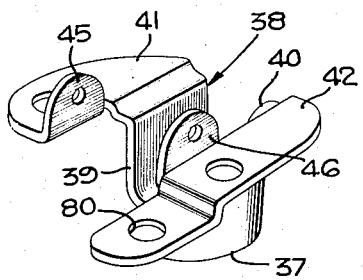
WILLIAM A. RAY,
INVENTOR.
BY John Flam
ATTORNEY United States Patent Office 2,700,393
Patented Jan. 25, 1955

2,700,393

MANUAL RESET VALVE STRUCTURE

William A. Ray, North Hollywood, Calif., assignor to General Controls Co., a corporation of California Application July 29, 1949, Serial No. 107,464

13 Claims. (Cl. 137—66)

This invention relates to safety controls for fluid fuel burners, such as gas burners.

In many prior systems, it is common to provide a pilot flame that is intended to be permanently lighted for igniting a main burner. A valve controlling the flow of fuel to the main burner is often arranged to respond to a definite condition, such as temperature, pressure, or the like, or to a combination of conditions. Accordingly, the main burner is ignited by the pilot flame and continues to be active until a condition is attained; then the valve passing fuel to the burner is automatically closed.

In such well-known systems, safety precautions may be provided ensuring that flow of fuel to the main burner cannot occur when the pilot flame is extinguished. Such extinguishment (occuring occasionally by accident) therefore causes a safety valve to close.

In order to effect this result, these systems utilize an electromagnet energized, for example, by a thermocouple or thermopile affected by the pilot flame. When the pilot flame is in existence, sufficient electrical power is generated by the thermocouple to hold the safety valve open, as by holding an armature connected to the valve closure. Promptly upon extinguishment of the pilot flame, the electromagnet is deenergized, the armature is released, and a spring or gravity moves the safety valve closure to closed position.

Obviously, only a minute electric power can be generated by the aid of the pilot flame. This power is insufficient to attract the armature from its dropped position. Accordingly, to start the system over again, after a pilot flame failure, it is necessary in such prior systems to reset the armature by moving it manually to attracted position and thereby opening the safety valve.

Opening of the safety valve in this manner while relighting the pilot burner would cause fuel to flow to the main burner, with a probability of producing an explosion at the main burner. Accordingly, care had to be taken to close a shut-off valve for the main burner before relighting the pilot. By appropriate interlocking mechanism (shown, for example, in an application filed in the name of William A. Ray on December 14, 1948, entitled "Safety Control Fuel Valve," and having Serial Number 65,113, now Patent No. 2,624,358), the shut-off valve is so arranged that it must remain closed during the resetting operation.

There are several disadvantages in a system of this character in which the armature is moved into and out of contact with the electromagnet core. There is a likelihood of accumulation of foreign matter between the armature and the pole faces of the core; also, the opening of the safety valve imposes a relatively large force urging the armature into contact. And, in addition, corrosion of the active magnetic surfaces may occur.

It is one of the objects of this invention to obviate these disadvantages. It is another object of this invention to provide a safety system of this character in which the armature is held in place against the pole faces of the electromagnet at all times, except for an instant after the pilot flame is extinguished, thereby ensuring against deterioration of the magnetic structure.

It is still another object of this invention to provide a valve system that incorporates a simple and effective latching device for a valve closure in open position, and that responds to a condition of the system for releasing the closure and thereby closing the valve.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 2 is a view, similar to Fig. 1, showing the safety valve closure held in open position;

Fig. 4 is a sectional view, taken along a plane corresponding to line 4—4 of Fig. 1;

Fig. 5 is an exploded pictorial view of a part of the structure illustrated in Figs. 1, 2, 3, and 4;

Fig. 7 is a pictorial view of one of the elements used in connection with the valve; and Fig. 8 is a plan view of the element shown in Fig. 7 and its associated parts.

Figure 1:
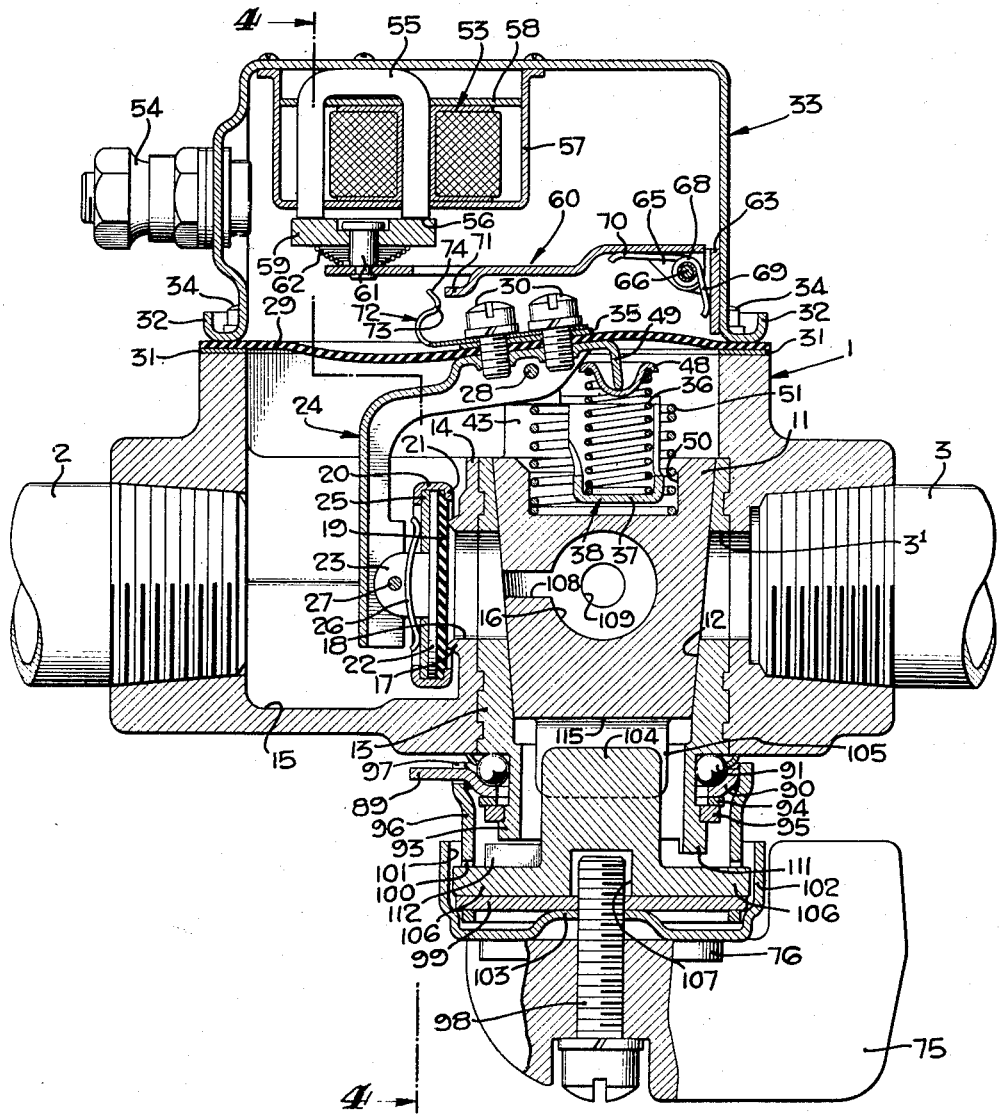
Figure 1 is a sectional view of a valve structure incorporating the invention, the valve being in closed or inactive position.

A valve body 1 is shown as having an inlet conduit 2 and an outlet conduit 3 appropriately connected into the valve body 1. As shown diagrammatically in Fig. 6, the outlet conduit 3 serves to pass fuel to a main burner 4 in response to the operation of a limit switch device 6. This limit switch device 6, for example, may be a thermostat in a space to be heated. A pilot burner 7 is adapted to provide a pilot flame 8 for igniting the burner 4 when the safety valve structure and the electromagnetically operated valve 5 are open. Conduit 9 leads from the pilot burner 7 into the valve body 1 where, as hereinafter explained, it may be connected with the inlet conduit 2.

Figure 6:
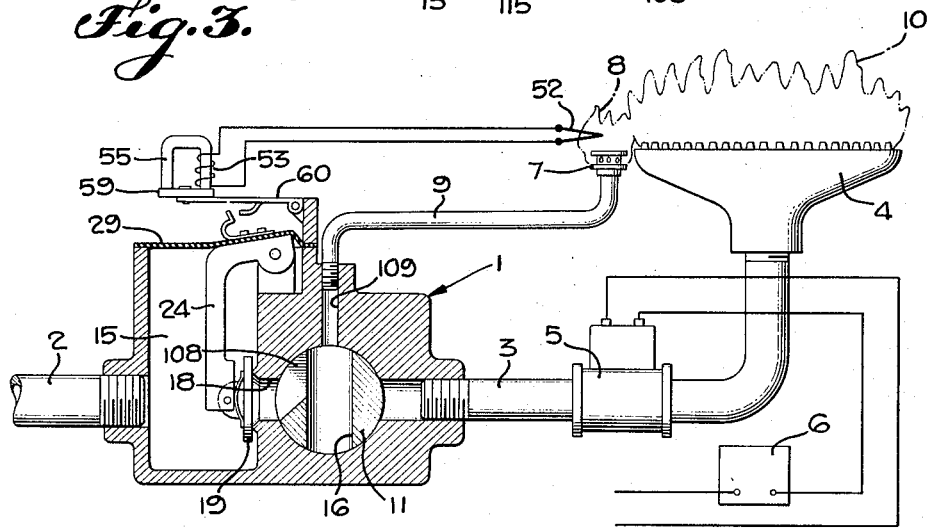
Fig. 6 is a diagrammatic view, illustrating the valve structure incorporated in a fuel burner system.

When the system is in operation, the main burner flame 10 (Fig. 6) is in existence. Since, however, the safety valve structure, as shown in Fig. 6, is closed, and the system is not in operation, both the pilot and main burner flames 8 and 10 are indicated in phantom lines.

The valve body 1 includes a main shut-off valve structure, as well as a safety valve structure which automatically closes when the pilot flame 8 is extinguished. The main shut-off valve structure includes a rotary plug 11 arranged, in the present instance, on a vertical axis and tapering downwardly to contact a tapered valve seat 12. In the diagrammatic representation of Fig. 6, this plug 11 is shown on a horizontal axis. This change is made only in the interest of clarity.

The important parts of the main shut-off valve structure may be made substantially identical with the structure illustrated in a prior application, Serial Number 55,119, filed October 18, 1948, now Patent No. 2,653,622, in the name of William A. Ray, and entitled "Automatic Safety Valve For Fuel Burners."

For example, the seat 12 may be formed by a lining sleeve 13 disposed in boss 14 extending across the valve body 1. An inlet chamber 15 is in constant communication with the inlet conduit 2. However, passage of fuel from the inlet conduit 2 to the outlet conduit 3 via port $3^1$ is controlled by a safety valve structure and by the angular position of the plug 11. Plug 11 has a diametrical port 16 which, in the position of Figs. 1, 2, and 3, serves to interrupt the flow of fuel from the inlet chamber 15 to the outlet conduit 3.

The safety valve structure is shown as closed in Figs. 1 and 6. This structure includes an annular narrow valve seat 17 surrounding a safety valve port 18 that leads radially to the plug 11. Cooperating with the seat 17 is a disc 19 made of a yielding material, such as rubber, or the like, and held in a frame 20. This frame 20 has inwardly turned edge 21 engaging the inner face of the disc 19. Backing the disc 19 is a metal disc 22 having a central ear 23. This central ear 23 is pivotally mounted upon a lever 24 that serves as the main support for the safety valve closure structure. A backing plate 25 is also enclosed in the frame 20 and has a slot through which the ear 23 projects. A bowed spring 26 is disposed between the pivot pin 27 and the backing plate 25. This spring 26 is appropriately slotted to permit the passage of the ear 23. The lever 24 is made channel-shaped to provide a central channel to accommodate the ear 23 (see, particularly, Fig. 4).

A pivot pin 28 is provided for the lever 24. This pin is supported in a manner to be hereinafter described. It is sufficient, for the present, to note that, as shown most clearly in Fig. 4, the pin 28 passes through a wider portion of the lever 24. The lever 24 is attached to a flexible diaphragm 29, as by the aid of screws 30. The diaphragm 29 closes the open upper end of the valve body 1. It is held in place against a gasket ring 31, as by a flange 32 of a casing 33. Fastening screws 34 pass through the flange 32 and are threaded into the body 1. The casing 33 is rectangular, and the screws 34 may be located adjacent the corners of the casing 33.

The screws 30, which join the lever 24 to the diaphragm 29, have heads disposed externally of the chamber 15 of the valve body 1. These screws are accommodated in threaded apertures in the lever 24. A plate 35 is placed above the diaphragm 29 in order to prevent undue flexure of the diaphragm 29 at this point. The diaphragm 29, as shown in Figs. 1 and 2, can be flexed while maintaining a seal for the chamber 15 as the safety valve closure structure is moved from the closed position of Fig. 1 to the open position of Fig. 2.

The safety valve structure is biased toward closing position by the aid of a compression spring 36. The lower end of the compression spring 36 rests upon a bottom wall 37 of a bracket structure 38, shown most clearly in Figs. 7 and 8. This bracket structure includes a pair of spaced legs 39 and 40 between which the lower wall 37 extends. These legs 39 and 40 terminate in the side flanges 41 and 42 which rest, respectively, upon the boss 43 and upon a flat surface 44 disposed to the right of the plug structure, as shown in Fig. 4. Ears 45 and 46 are struck up from the bracket 38 for the accommodation of the pivot pin 28 for the lever 24. Screws 47 pass through appropriate apertures in the flanges 41 and 42 for holding the bracket structure in position.

The upper end of the compression spring 36 accommodates a flanged cup 48 resting within the spring 36. The lever 24 carries a downwardly directed extension 49 contacting the cup 48. Accordingly, the upward thrust of the spring 36 operates through the projection 49 to urge the lever 24 in a counter-clockwise direction and toward the closing position of Fig. 1.

The plug 11 is provided with an upper recess 50 into which the bottom wall 37 extends. This recess serves also to accommodate a compression spring 51 urging the plug 11 toward its seat. The upper end of the spring 51 is restrained by the flanges 41 and 42 of the bracket structure 38.

When the safety valve structure is moved, in a manner to be hereinafter described, to the open position of Fig. 2, it may be held latched in this open position provided that the pilot flame 8 is established. For this purpose, use is made of a thermocouple 52 adapted to be influenced by the pilot flame 8 (Fig. 6). When the pilot flame 8 is in existence, sufficient electrical power is generated by the thermocouple 52 to cause the safety valve structure to be held in open position against the bias of compression spring 36. In the present instance, the electrical power generated is transmitted to an electromagnet coil 53, as by the aid of connections provided by a plurality of terminal posts 54. These terminal posts (Figs. 1, 2 and 3) are appropriately insulatingly supported upon the casing 33.

The coil 53 surrounds one leg of a U-shaped core 55. The lower ends of the core 55 form polar areas 56 and extend through a supplemental casing 57. This supplemental casing 57 is appropriately attached within the casing 33. A cover plate 58 is provided to extend above the coil 53.

The casings 33, 57, and the cover plate 58 are made of non-magnetic material.

The electromagnetic core 55 is arranged to cooperate with a disc armature 59. In the normal operation of the system, this armature 59 is urged continuously against the polar areas 56. For this purpose, it is mounted near the extremity of a lever 60 (see, also, Fig. 5). In order to ensure that the disc armature 59 can accommodate itself accurately to the pole face areas 56, it is loosely mounted upon a fixed headed pin 61 attached to the upper face of the lever 60. A compression spring 62, of gradually increasing diameter, is interposed between the top of lever 60 and the lower surface of the armature 59.

The lever 60 is pivoted to the right-hand side of the casing 53 by the aid of a bracket 63. This bracket 63 has a pair of spaced ears 64 (Fig. 5) cooperating with ears 65 formed at the right-hand end of the lever 60. A pivot pin 66 passes through all of the ears, and a sleeve 67 is disposed over the pivot pin 66 between the ears 65. This sleeve passes through a helical spring 68. One arm 69 of this spring contacts the bracket 63. The other arm 70 contacts the lower surface of the lever 60 and urges it continuously in a clockwise direction. Accordingly, there is a continuous force yieldingly holding the armature 59 against the core 55.

In the position shown in Fig. 1 (the safety valve structure being closed), the lever 60 is free of the safety valve closure structure. However, when the safety valve closure structure is opened, in a manner to be hereinafter described, latching parts carried by levers 24 and 60 come into engagement and serve to hold the lever 24 in open position, providing the electromagnetic coil 53 is energized.

For this purpose, lever 60 has a latching projection 71 that is struck out to extend below the main body of the lever 60. Cooperating with this latching part 71 is a latch member 72. This member is made of spring material. It has a body held underneath the heads of screws 30 and is thereby carried on the lever 24. This latch 72 may be made of relatively thin, resilient material, with a hook member 73 adapted to engage the upper surface of the latching member 71.

Thus, as lever 24 is moved in a clockwise direction about pivot pin 28, the sloping upper portion 74 of the latching spring member 72 contacts the edge of the latching member 71, and finally snaps over to the latched position of Fig. 2. Should the pilot flame 8 be not extinguished, enough force is exerted upon armature 59 by the electromagnetic structure to maintain the lever 60 in this latching position. In normal operation, therefore, the safety valve structure is held in the position of Fig. 2, permitting the passage of fuel to the outlet conduit 3 provided plug 11 is open.

Figure 3:
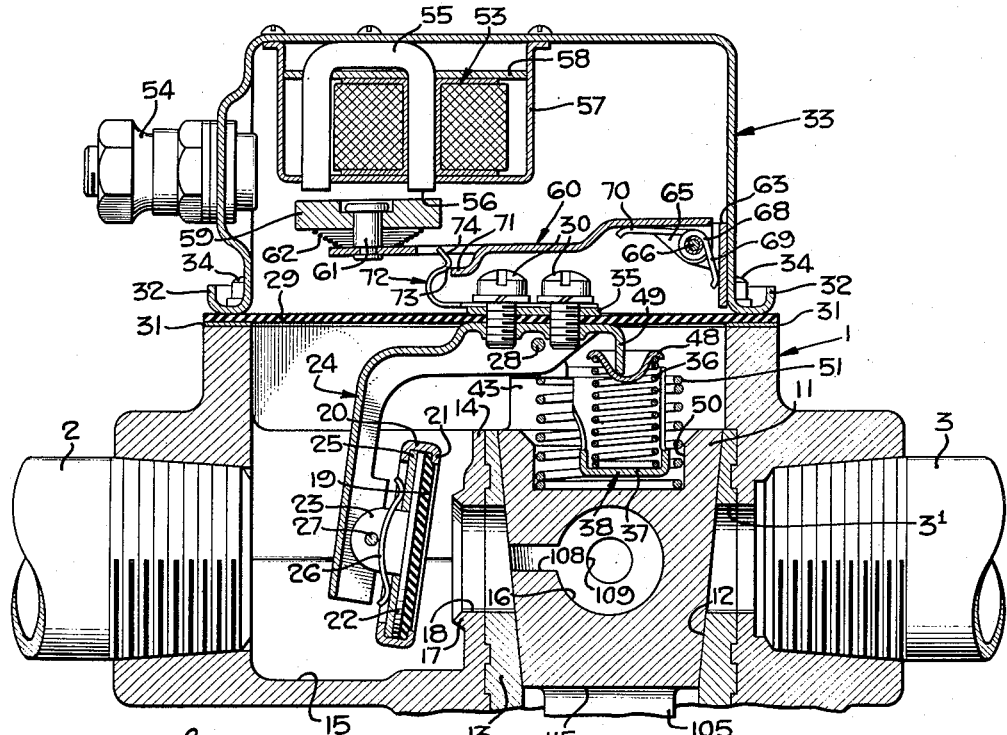
Fig. 3 is a view, similar to Fig. 1, illustrating the manner in which the safety valve is caused to close upon failure of the pilot flame.

In the event that the safety valve structure is manually moved to the open position of Fig. 2, so as to cause engagement of latch members 71 and 72 while the pilot flame 8 is not in existence, the force of spring 36 overcomes the force of the spring 68. Accordingly, the force of spring 36 causes the lever 24 to move in a counter-clockwise direction, urging the lever 60 likewise in a counter-clockwise direction, until the two members 71 and 72 disengage. This point of separation is illustrated in Fig. 3. There, armature 59 is urged away from the pole faces 56. When disengagement occurs between members 71 and 72, the spring 68 returns the armature 59 to the position of Fig. 1. Since the lever 24 is pivoted at a point below and to the left of the pivot for lever 60, counter-clockwise movement of lever 24 toward closing position causes this separation between members 71 and 72.

The instantaneous releasing movement of lever 60 thus occurs either upon failure of the pilot burner 7 to ignite, or upon accidental extinguishment of the pilot flame 8. In either case, the safety valve closure structure is caused to close by the action of spring 36; and, thereupon, substantially instantaneously the armature 59 is urged by spring 68 back to the position of Fig. 1.

Since the armature 59 is in constant contact with the polar areas 56 during normal operation of the system, and upon failure of the pilot flame, the contacting magnetic surfaces of the core 55 and the armature 59 may be maintained clean and free of foreign matter, or dirt of any kind. The armature 59 is moved away from the polar areas 56 only instantaneously upon failure of the pilot flame 8.

The safety valve closure structure is arranged to be moved manually in a clockwise, or opening, direction by the aid of mechanism most clearly shown in Fig. 4. Therein is indicated the arm 78 attached to one side of the lever 24. This arm is arranged to be pushed upwardly by a push rod 79 appropriately guided in the valve body 1. Thus, the upper end of this push rod has a reduced diameter which passes through a guiding aperture 80 in the flange 42 of bracket 38. A compression spring 81 is disposed between the lower surface of the flange 42 and a washer 82. This washer 82 is disposed around the push rod 79, and rests upon the shoulder between the upper and lower portions of the push rod. Recess 83 is formed in the valve body 1, into which the spring 81 extends. A sealing washer 84 is disposed between the bottom of the recess 83 and the washer 82.

The lower end of the push rod 79 extends below the body 1. It is adapted to be contacted by a cam lever 85 that is pivoted, by the aid of a pin 86, in a slot 87 formed in the bottom of the valve body 1. Lever 85, when it is rotated in a counter-clockwise direction, serves to urge the rod 79 upwardly, and thereby serves to move the safety valve closure lever 24 in a clockwise direction. Spring 81 serves to return the push rod 79 to the lowermost position illustrated in Fig. 4. The lever 85 has a rearward projection 88 limiting clockwise rotation of the lever 85 downwardly.

Movement of the lever 85 is effected by the aid of an actuator arm 89 (Figs. 1 and 4). This actuator arm 89 is movable about the axis of rotation of plug 11. It is formed integrally with an outer ball race 90. Ball bearings 91 are accommodated between this outer ball race 90 and the shoulder formed by the neck extension 93 at the bottom of the sleeve 13. This ball race is held in place on the neck portion 93 by the aid of a washer 94 and a split spring washer 95. This split spring washer 95 engages a shoulder formed on the neck extension 93.

The actuating arm 89 is arranged to be rotated by the aid of a sleeve 96. This sleeve 96 has a slot 97 in its upper periphery for the accommodation of the arm 89. Sleeve 96 is joined to a handle structure by the aid of a screw 98 that passes through a handle 75 and threadedly engages a cross bar 99. This cross bar 99 is accommodated in the lower end of a slot 100 in the sleeve 96. Its extremities extend into recesses 101 formed on a skirt member 102. Skirt member 102 is attached to the flange 76 of the handle 75. These recesses 101 are most conveniently formed by upsetting the sheet metal from which the skirt member 102 is formed, as shown by reference character 77 in Fig. 4. Accordingly, when the handle 75 is rotated, this causes a corresponding rotation of the skirt 102. Skirt 102 will, in turn, move the bar 99; and the bar 99, in turn, serves to rotate the sleeve 96. As shown most clearly in Figs. 1 and 2, the skirt member 102 has a raised portion 103 at its center, so that it may lie closely to the lower surface of the bar 99.

The plug 11 is also arranged to be rotated by the handle structure. For this purpose, a plug actuator key 104 is provided, which engages loosely in a slot 115 formed in the extension 105 of plug 11. This extension 105 extends below the plug 11. The key 104 has radial arms 106 that also project into the slot 100; and it has a clearance aperture 107 to permit the passage of the screw 98. The arms 106 are long enough so that they engage in diametrically opposite recesses 101.

In the shut-down position illustrated in Fig. 6, the safety valve closure 19 prevents passage of fuel to the pilot burner 7. When the closure 19 is lifted to the open position, the passage of fuel to the pilot burner 7 is permitted even while the plug 11 is in the closed position.

This is effected by the aid of a narrow port 108 communicating with the port 16. The pilot burner conduit 9 communicates with a port 109 in valve body 1. Accordingly, passage of fuel to the pilot burner 7 can be effected through ports 18, 108, 16, and 109. After the mechanism has been reset to the position of Fig. 2, the plug 11 can be rotated by the handle 75. Key 104 can rotate the plug 11 to a position ninety degrees counter-clockwise from that illustrated in Fig. 6. In this position, port 16 is in alignment with port 18 and the outlet conduit 3, and gas is permitted to flow to the main burner 4. At the same time, passage of fuel to the pilot burner 7 is not interrupted, since port 108 is in constant communication with port 109.

There is purposely left a substantial amount of loose play between the key 104 and the slot 115. In this way, sufficient free movement of the handle 75 is permitted to open the safety valve closure without requiring the plug valve 11 to be rotated from its closed position.

This opening movement of the safety valve closure is effected by a counter-clockwise movement of the handle 75 viewed from above Figs. 1 and 2. After the handle 75 is released and the latching members 71 and 72 are in operative engagement, as shown in Fig. 2, the spring 81 (Fig. 4) acts to urge the push rod 79 downwardly. This downward movement operates the lever 85 and urges the actuator 89 in a clockwise direction, where it is substantially central of the slot 115 of plug 11. Now, a further clockwise movement of the handle 75, as viewed from above, can bring the plug 11 to a position in which the main valve is open. In this open position, the actuator 89 is brought in close proximity to a spring-pressed ball 110 disposed in a recess formed in the lower portion of the valve body 1 (Fig. 4). Accordingly, there is a slight restraint against further clockwise movement of the handle 75, and the operator is thus warned that the main shut-off valve has been fully opened. Passage beyond the fully opened position is permitted, since the detent ball 110 may be depressed. A ninety degree movement beyond this fully opened position of the valve will produce a complete shut-off of gas both to the pilot burner 7 and to the main burner 4. This corresponds to a seasonal shut-off. A stop 111 (Figs. 1 and 2) is provided at the lower edge of the neck portion 93. This coacts with one or more stops 112 carried by the key 104. Cooperation of these stops 111 and 112 restricts operative movement of the key 104 to about one hundred and eightly degrees. One limit of the movement is represented by Fig. 6, and the other limit when the plug 11 is one hundred and eightly degrees displaced from that position.

The plug rotating mechanism and the stops with the detent 110 are described and claimed in the prior application, Serial Number 55,119, hereinabove identified.

The inventor claims:

1. In a safety fuel valve structure having a pivoted closure: means for moving the closure to open position; a spring urging the closure angularly about its pivot toward closing position; a first latching member carried by the closure; a second latching member; a pivoted support for said second latching member; said latching members engaging when the closure is moved to open position, and operating to hold the closure in open position only when the pivoted support is restrained from movement; means resiliently holding said second latching member in latch-engaging position when the first latching member is disengaged from the second latching member; an electromagnet; and an armature for the electromagnet and carried by the pivoted support for holding the pivoted support in latching position against the force of the spring only when the electromagnet is energized.

2. In a safety fuel valve: a main valve closure; a safety valve closure; means for moving the safety valve closure to open position, including an operative connection with the main valve closure for ensuring that the main valve closure is closed before the safety valve closure can be opened; means biasing the safety valve closure to closed position; and means for releasably holding the safety valve closure in open position, comprising a pair of separable engaging members, one of which is carried by the safety valve closure; the other member being movable; means urging the other member to one position in which said other member may be engaged by said one member; said other member being movable away from said one position by said one member when said members are engaged, a predetermined movement of said other member from said one position causing disengagement of the members; said urging means being insufficient to prevent separation of the members; said other member being freed when the members are disengaged, and moved back to said one position by said urging means; and condition responsive means for supplementing said urging means, to an extent when the condition exists to maintain said other member in said one position.

3. In a safety fuel valve: a main valve closure; a safety valve closure; means for moving the safety valve closure to open position; said means including an operative connection with the main valve closure for ensuring that the main valve closure is closed before the safety valve closure can be opened; means biasing the safety valve closure to closed position; means for releasably holding the safety valve closure in open position, comprising a pair of separable engaging members, one of which is carried by the safety valve closure; the other member being movable; means urging the other member to one position in which said other member may be engaged by said one member; said other member being movable away from said one position by said one member when said members are engaged, a predetermined movement of said other member from said one position causing disengagement of the members; said urging means being insufficient to prevent separation of the members; said other member being freed when the members are disengaged, and moved back to said one position by said urging means; an electromagnet; and an armature for the electromagnet and carried by said other member, said armature being in attracted position when said other member is in said one position, said armature, when the electromagnet is energized, serving to prevent movement of said other member from said one position.

4. In a valve structure having a movable valve closure structure, and means for moving the closure structure from closed to open position: means urging the closure to closed position; a pair of relatively movable interengaging latching members for holding the closure structure in open position; one of the latching members being connected to the closure structure; an electromagnet; an armature for the electromagnet; and means for resiliently placing the armature in attracted position with respect to the electromagnet; said placing means being connected to the other latching member; the holding force of the electromagnet, when energized, and the resilient force of the means for placing the armature in attracted position, exceeding the force of the means for urging the closure structure to closed position; said force of the means urging the closure to closed position exceeding that of the resilient force of the placing means; said one latching member when the electromagnet is de-energized, being arranged only instantaneously to move the other latch member to cause the armature to be placed out of the attracted position, said resilient means thereafter returning the armature to its attracted position.

5. In a valve structure having a movable closure structure: an electromagnet having a member movable toward and away from attracted position; first means constantly urging said movable member toward attracted position; second means constantly urging the closure structure to closed position; means for moving the closure structure to open position against the force of said second means; and means having separable parts respectively carried by the closure structure and the movable member engageable with each other to couple said first and second means in opposition to each other; said parts being engageable when said movable member is substantially in attracted position and when the closure structure is in opened position; said parts being disengageable when said movable member is moved from attracted position; the holding force of the said first means only when supplemented by the force of said electromagnet exceeding the force of said second means; said movable member being moved to attracted position by said first means when said separable members are disengaged.

6. In a valve structure having a movable closure structure: an electromagnet having a member movable toward and away from attracted position; first means constantly urging said movable member toward attracted position; second means constantly urging the closure structure to closed position; means for moving the closure structure to open position against the force of said second means; and a detachable connection between the closure structure and the movable member effective to couple said first and second means in opposition to each other; said detachable connection being effected upon movement of said closure structure to open position, said detachable connection being separated upon movement of said movable member away from attracted position; the holding force of the said first means only when supplemented by the force of said electromagnet exceeding the force of said second means; said movable member being moved to attracted position by said first means when said detachable connection is ineffective.

7. In a valve structure having a closure movable between open and closed position: a pair of latching members, the first of said latching members being movable between two positions; the second of said members being carried by the closure; means yieldingly urging said first latching member to one position; said second latching member being engageable with said first latching member when said closure is moved to open position and when said first latching member is in said one position; said latching members being disengaged when said first latching member moves from said one position; said first latching member being moved to said one position when said latching means are disengaged; the closure biasing means being capable of moving the said first latching member to releasing position against the force of the yieldingly urging means; and condition responsive means supplementing the force of said urging means for maintaining the latching members in holding position while the condition exists.

8. In a valve structure having a closure movable between open and closed position: a pair of latching members, the first of said latching members being movable between two positions; the second of said members being carried by the closure; means yieldingly urging said first latching member to one position; said second latching member being engageable with said first latching member when said closure is moved to open position and when said first latching member is in said one position; said latching members being disengaged when said first latching member moves from said one position; said first latching member being moved to said one position when said latching means are disengaged; and an electromagnet which, when energized, supplements the force of said urging means for maintaining the latching members in holding position.

9. In a valve structure having a closure movable between open and closed position: a pair of latching members, the first of said latching members being movable between two positions; the second of said members being carried by the closure; means yieldingly urging said first latching member to one position; said second latching member being engageable with said first latching member when said closure is moved to open position and when said first latching member is in said one position; said closure biasing means acting through said latching members being capable of moving said first latching member away from said one position; said first latching member being guided to move out of engagement with said second latching member and back to said one position under the influence of said yieldingly urging means after a predetermined movement of said first latching member from said one position; an electromagnet; and an armature carried by said first latching member and in attracted position when said first latching member is in said one position; said electromagnet, when energized, preventing movement of said first latching member from said one position.

10. In a valve structure having a closure movable between open and closed position: a pair of latching members, the first of said latching members being movable between two positions; the second of said members being carried by the closure; means yieldingly urging said first latching member to one position; said second latching member being engageable with said first latching member when said closure is moved to open position and when said first latching member is in said one position; said closure biasing means acting through said latching members being capable of moving said first latching member away from said one position; said first latching member being guided to move out of engagement with said second latching member and back to said one position under the influence of said yieldingly urging means after a predetermined movement of said first latching member from said one position; and condition responsive means for preventing movement of said first latching member from said one position to hold said valve closure in open position, said condition responsive means, in the absence of the condition, being incapable of holding said first latching means in said one position.

11. In a safety fuel valve structure having a pivoted closure: means for moving the closure to open position; a spring urging the closure angularly about its pivot toward closing position; a first latching member carried by the closure; a second latching member; a pivoted support for said second latching member; said support and said second latching member being movable between two positions; means urging the pivoted support toward one position in which said second latching member may be engaged by said first latching member, said latching members being operative to hold the closure in open position only when the pivoted support is restrained from movement, said closure, when moved to open position, serving to move the first latching member into engagement with said second latching member; the latching members being disengaged upon movement of said pivoted support and said second latching member from said one position; said means that urges the pivoted support returning said pivoted support and said second latching member to said one position when said latching members are disengaged; said support urging means being ineffective to retain said pivoted support and said second latching member in said one position against the force of said spring; and condition responsive means for restraining movement of said pivoted support and said second latching member from said one position, said condition responsive means, in the absence of the condition, being incapable of holding said second latching means and said pivoted support in said one position.

12. In a safety fuel valve structure having a pivoted closure: means for moving the closure to open position; a spring urging the closure angularly about its pivot toward closing position; a first latching member carried by the closure; a second latching member; a pivoted support for said second latching member; said support and said second latching member being movable between two positions; means urging the pivoted support toward one position in which said second latching member may be engaged by said first latching member, said latching members being operative to hold the closure in open position only when the pivoted support is restrained from movement, said closure, when moved to open position, serving to move the first latching member into engagement with said second latching member; the latching members being disengaged upon movement of said pivoted support and said second latching member from said one position; said means that urges the pivoted support returning said pivoted support and said second latching member to said one position when said latching members are disengaged; said support urging means being ineffective to retain said pivoted support and said second latching member in said one position against the force of said spring; an electromagnet; and an armature carried by said pivoted support and in attracted position when said pivoted support is in said one position; said electromagnet, when energized, preventing movement of said pivoted support from said one position.

13. In a valve structure having a movable closure structure, and means for moving the closure structure from closed to open position; first means urging the closure to closed position; a pair of separable parts, one carried by the closure structure; a movable mounting for the other part; second means urging said movable mounting toward one position in which said one part may engage said other part; said one part being engageable with said other part upon opening movement of said closure; said movable mounting being moved when said parts are engaged, unless restrained, from said one position to another position in which said parts are disengaged; said second urging means returning said movable mounting to said one position when said parts are disengaged; and condition responsive means for exerting a force supplementing the force of said second urging means; said second urging means, only when supplemented by said condition responsive means, restraining movement of said movable mounting from said one position.

References Cited in the file of this patent
UNITED STATES PATENTS

| | | |
|---|---|---|
| 2,236,227 | Wantz | Mar. 25, 1941 |
| 2,258,811 | Ray | Oct. 14, 1941 |
| 2,496,638 | Ray | Feb. 7, 1950 |
| 2,533,982 | Weber | Dec. 12, 1950 |
| 2,567,123 | Ray | Sept. 4, 1951 |
| 2,570,593 | Ray | Oct. 9, 1951 |